(No Model.) 3 Sheets—Sheet 1.
J. F. D. SCHRADER.
APPARATUS FOR MAPPING OR DRAWING LANDS.
No. 491,193. Patented Feb. 7, 1893.
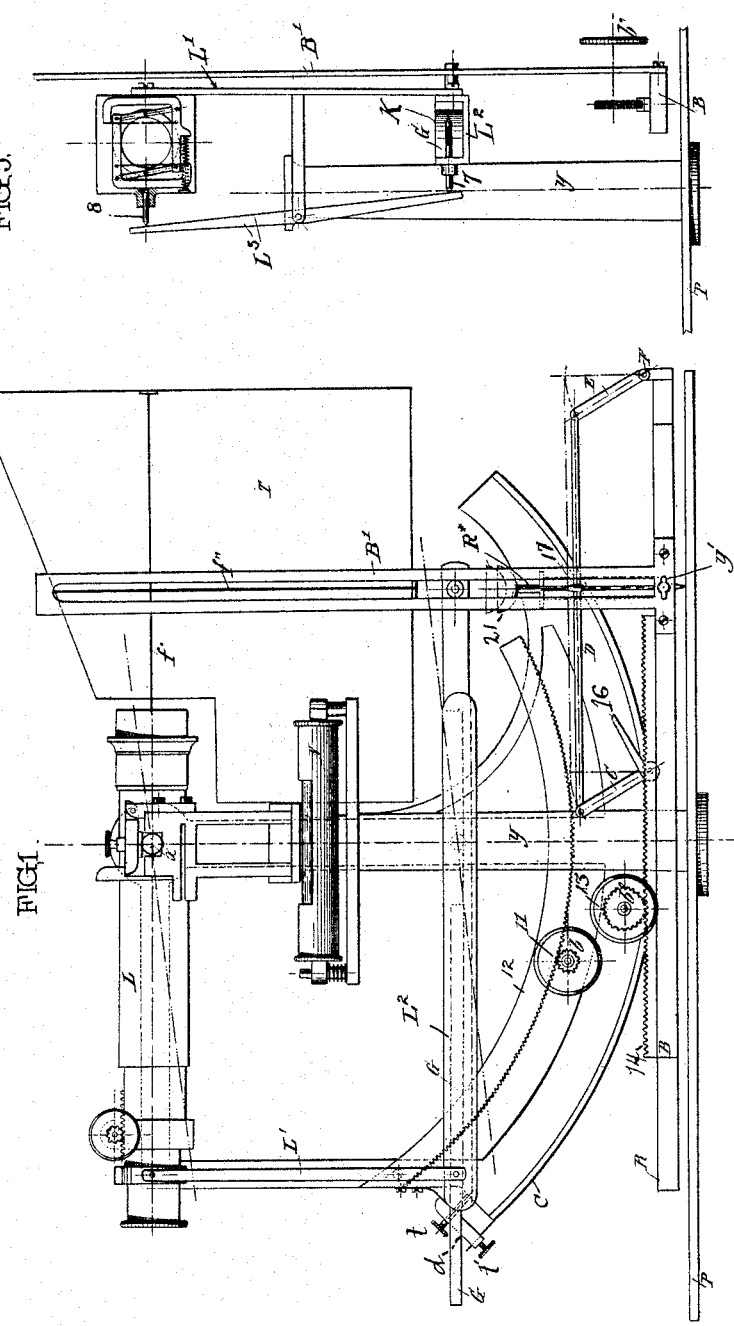

(No Model.) 3 Sheets—Sheet 2.
J. F. D. SCHRADER.
APPARATUS FOR MAPPING OR DRAWING LANDS.
No. 491,193. Patented Feb. 7, 1893.
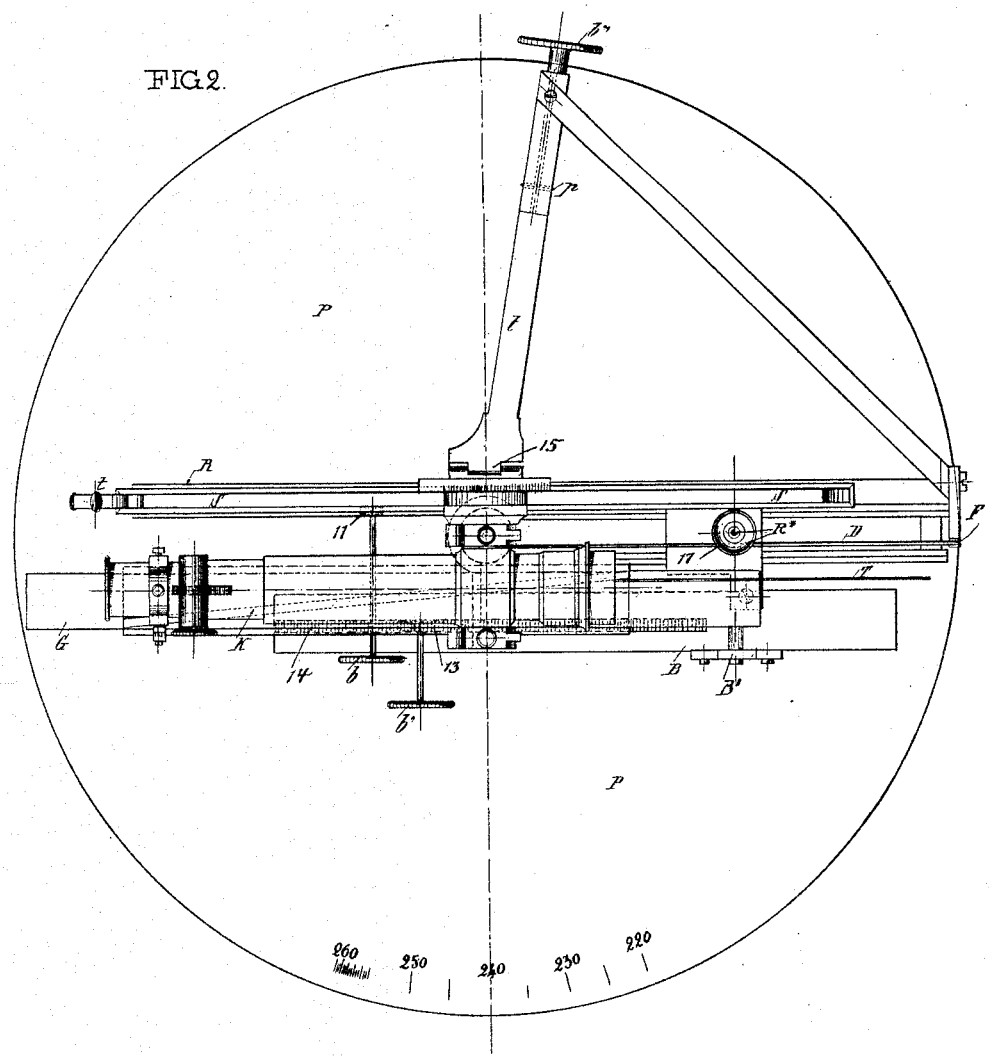
Witnesses:
Jonathon Cieley
Y. M. Copenhaver
Inventor:
Jean F. D. Schrader
By Pollok & Mauro
his Attorneys.

(No Model.) 3 Sheets—Sheet 3.

J. F. D. SCHRADER.
APPARATUS FOR MAPPING OR DRAWING LANDS.

No. 491,193. Patented Feb. 7, 1893.

Witnesses:
Geo. T. Smallwood
Jonathan Allen

Inventor:
Jean F. D. Schrader
by Pollok & Mauro,
his attorneys.

UNITED STATES PATENT OFFICE.

JEAN FRANÇOIS DANIEL SCHRADER, OF PARIS, FRANCE.

APPARATUS FOR MAPPING OR DRAWING LANDS.

SPECIFICATION forming part of Letters Patent No. 491,193, dated February 7, 1893.

Application filed May 27, 1891. Serial No. 394,294. (No model.)

*To all whom it may concern:*

Be it known that I, JEAN FRANÇOIS DANIEL SCHRADER, (generally called FRANZ SCHRADER,) of Paris, France, have invented certain new and useful Improvements in Apparatus for Directly Mapping or Drawing Lands, of which the following specification is a full, clear, and exact description.

This invention relates to an apparatus for inscribing automatically, the elements or results of a topographical survey, so as to substitute the direct drawing for the reading of angles and calculations which heretofore have served to establish such drawing.

To this end the instrument ought to transform every sight, when directed by the operator to any point, into an impression which permits the determination of the three co-ordinates of this point, and the placing of the same directly on the map. Two cases present themselves: According to the first, a point or series of points is sighted from the ends of a line of known length as a base; according to the second, an object of known size is sighted as from a point or series of points. In the first case, the instrument gives the elements under the form of a diagram, from which the direct construction may be taken; in the second, it maps directly the survey itself.

The dispositions adopted are illustrated by way of example in the accompanying drawings, which form part of this specification.

Figure 4:
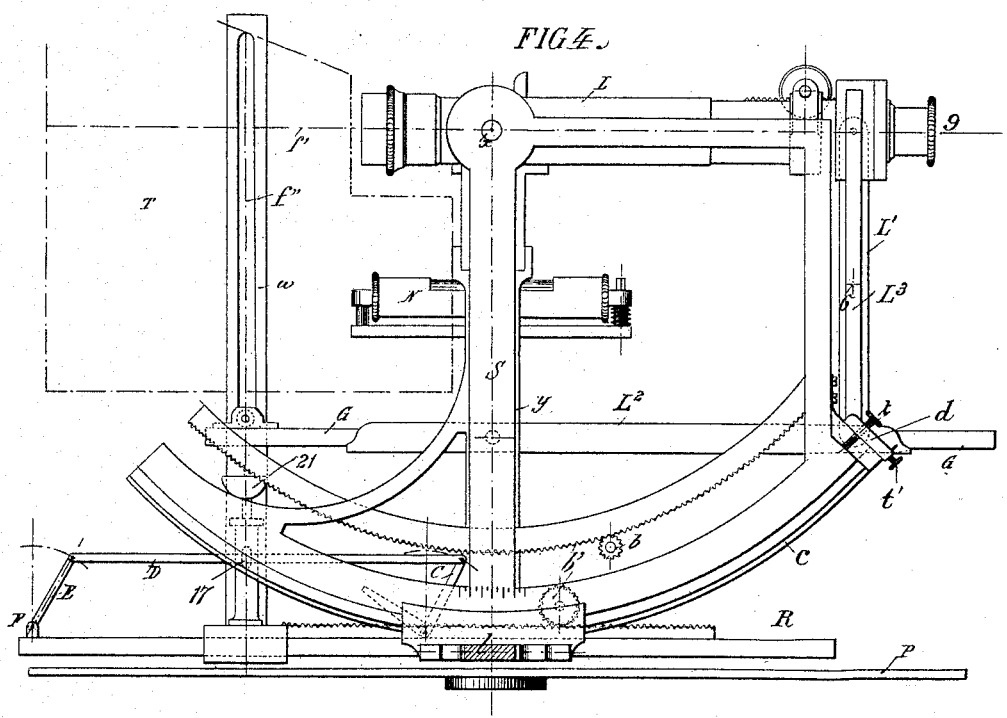
Figure 5:
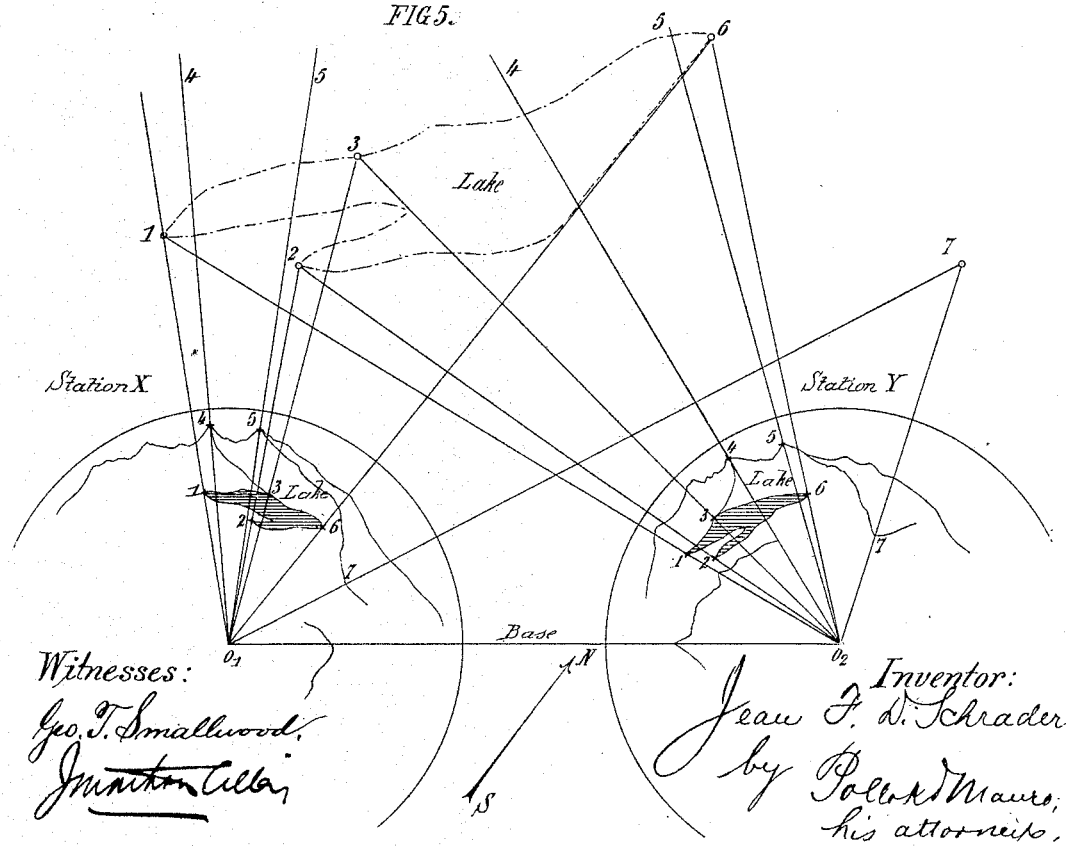

Figure 1 is a side elevation, Fig. 2 a plan, and Fig. 3 a partial end view of the instrument. Fig. 4 is an elevation of the side opposite to shown in Fig. 1 and Fig. 5 is a diagram illustrating the operation of the apparatus.

The telescope L is mounted on trunnions $x$ on a post $y$, and forms one side of a jointed parallelogram, of which the vertical sides are formed by the vertical bar L', and the post $y$, while the side parallel with the telescope is formed by the piece L². In the piece L², is a slide G, whose object will be explained below. The post $y$ is swiveled, so that the telescope with the other parts of the parallelogram and the slide G can be swung about a vertical axis, and be sighted in any direction over a suitable peripherical zone. To the telescope is fastened a vertical sector S, whose limb is graduated and whose center coincides with the axis of the trunnions $x$. To the sector S and consequently to the telescope L also, is connected a horizontal rule R, which transforms every vertical displacement of the telescope into a rectilinear movement of the rule, the amplitude of such movement corresponding with the angular displacement of the sector. The connection of sector S and rule R may be effected in any suitable way. As shown, a flexible steel band $c$ is attached to a piece $d$ at the end of the sector and carried to the opposite end of the rule. A set screw $t$ is provided whereby the band may be tightened, and a second screw $t'$, whereby it may be wholly detached, to disconnect the sector and rule.

The foregoing parts rest upon a horizontal table or tablet holder P. A pencil or style R* placed at a suitable point on the rule R bears at the point against the table P, on which the tablet in the form, say, of a sheet of paper, is placed. This style or pencil therefore moves radially of the table in a vertical plane parallel with the axis of the telescope, and partakes also of the swivel movements of the telescope about the vertical axis of the post $y$. Thus every change of the telescope in azimuth translates itself into an azimuthal movement of the pencil and every vertical movement of the telescope induces a movement of the pencil in a vertical plane parallel with the axis of the telescope. Every sight, therefore, will be represented by a point which is exactly determined, and every series of sights by a continuous outline. The azimuths and zenith angles of the points sighted, will therefore be written down with their relative values preserved and measurable.

A second rule B capable of a longitudinal movement, independent of the rule R, but parallel thereto, and movable with said rule and the other parts before mentioned about the vertical axis of post $y$, is adapted to engage the same pencil or style R* means being provided such as a set-screw shown at $y'$, Fig. 1, so that said pencil can at will be engaged with either of said rules and be disengaged from the other. The rule B in place of being actuated with the telescope itself, is movable independently thereof, and acts upon a movable micrometer in the field of the telescope. The transmission of movement is effected as follows: To the rule B, is fixed a vertical piece B', forming an upright along which a projection on the slide G may move freely, the said projection fitting in a slot in the said upright B'. Thus the end of the slide G may rise and fall, and said slide is also moved in and out in the piece $L^2$, according to the displacement of the rule B. By this arrangement the lower side $L^2$ of the before mentioned parallelogram (suitably prolonged), constitutes the hypotenuse of a right-angled triangle, of which rule B occupies the base, and the upright B' the altitude, the hypotenuse being proportional to the distance sighted, the altitude the difference in level between the station sighting and the point sighted, and the base to the horizontal distance separating the verticals of said station and point. This last distance will be marked automatically on the diagram. The difference in level can be read on a special tablet fastened to the center post $y$ of the apparatus, by reference to the variable summit of the angle formed by the hypotenuse and vertical side (or altitude) of the triangle. A lever $L^3$ fulcrumed at 6, on a projection from the bar $L^2$ is acted upon at its lower end by the agate pin 7, which slides in a hole in the piece $L^2$ and is controlled by the oblique edge K (Fig. 3) of the slide G, acting upon the end of said pin. The upper end of the lever $L^3$ presses against the pin 8, fixed in the frame which carries the movable wire of the micrometer 9. A spring 10 tends to return the frame and lever $L^3$. As therefore the rule B is moved in and out, it draws with it the slide G (in consequence of the projection on said slide engaging the upright B'), and causes the lever $L^3$, and movable parts of the micrometer to approach or to recede from the stationary parts thereof.

The vertical movements are imparted to the sector S and telescope L by the pinion 11, engaging a rack 12, on the sector (or it might be a rack on the rule R), and operated by a milled wheel $b$. The longitudinal movements of the rule B and marker $R^*$ are imparted by the pinion 13, engaging a rack 14 on said rule, and operated by a milled wheel $b'$. The movements in azimuth (or in other words, the rotation about the axis of post $y$), are imparted to the telescope L, rules B and R, and connected parts, by means of a double lever-arm 1 (see Fig. 2), so constructed that its two members brace each other and form with the frame of the instrument a figure which represents all lateral flexure. For very small movements the lever 1, is lowered by turning on its pins 15, so that the spur wheel $p$, which is fixed on a shaft journaled in bearings on said lever, rests on the table P, and the lever is moved by turning the said spur wheel through the milled wheel $b''$. To lift the pencil after sighting, the operator presses with his finger on the end 16 of the bent lever C, which is connected by the rod D with the arm E, hinged at F, the said rod engaging the collar 17 on pencil $R^*$.

The table P can be graduated, at its periphery and provided with a vernier fixed at the extremity of the frame supporting the rule R, the rule B, and the style or pencil $R^*$. This latter is surmounted by a bar or by a small cup 21 supplied with a variable weight.

The level, the telescope, and the various organs can be adjusted together or independently.

A level N set to correspond with the vertical plane of the telescope, permits a perfect horizontality to be given to the system.

In case only the measure of the distance of a predetermined base is to be obtained, the rule R and the means for communicating movement to it from sector S may be disconnected. It suffices then to employ the remaining organs. In the opposite case where only sights are to be taken from the ends of a given base, toward a common point, the parallelogram and connected pieces may be disconnected from the telescope. If exceptionally, a simple projection of an oblique surface on a plane is to be obtained, it will suffice to act directly from the horizontal rule R on the micrometer.

The instrument is made level in any ordinary or suitable way. It may then be used to execute two series of operation according as the first or second of the cases before referred to is followed. In either case, a surface of paper or other material, as metal, adapted to receive a mark, is fixed on the table P.

*First case. From the ends of a known base, to sight and inscribe one or more points in continuous lines.*—First. Lift the pencil. Second. Bring the zero of sector S into registry with the zero of the vernier, using the milled wheel $b$ for the purpose. Third. Lower the pencil, and by the aid of lever 1 cause the instrument to make a complete rotation about the axis of post $y$. The pencil will trace a circle which corresponds to the horizontal plane passing through the telescope. Fourth. Lift the pencil and bring the telescope by a simultaneous operation of the milled wheel $b$, and the lever 1, into the position where the center of the reticule coincides with the point at which it is wished to commence the series of observations. Fifth. Lower the pencil after which a vertical oscillation by means of the wheel $b$ will make a line which represents the azimuth of the point sighted; a horizontal oscillation by means of the lever 1, (the telescope having been returned to the central position) will make a line which represents the zenith distance. These oscillations may be repeated several times if it is wished to prove the measure. The result is a small cross of which the center indicates the situation of the point. Sixth. If for isolated sights a continuous sighting is desired, the points sighted being traced as a line, the attention is fixed on a black point marked in the center of the reticule of the telescope: then by a simultaneous movement of the lever 1 and wheel $b$ (such movement being performed almost unconsciously and instinctively) the said black point is made to follow the line or the contour which it is desired to inscribe on the table or tablet thereon, such as the profile of a mountain, the course of a stream, the perimeter of a village, line of road or path, and the like. The line will be mechanically inscribed and each point of it will be measurable in azimuth and zenith distance. Seventh. Care should be taken to write alongside the crosses or lines notes which will enable them to be identified afterward. The line produced as pointed out above gives for each of its points the direction and inclination of the telescope. It also gives the position of each of its points by means of the little crosses heretofore mentioned, the cross being produced first by the displacement of the pencil around the vertical axis of the instrument, and second by its displacement in the vertical plane of sight. When the work of sighting is finished, a perigraphic plane figure is obtained which reproduces all parts of the horizon which it has been thought proper to determine. On removing then the tablet, the objects within the lines of the automatic drawing, may be sketched in. Thus a perigraphic panorama is obtained which can be measured. Eighth. To transform into a map, the data furnished by such circular horizons, it suffices to place the points indicating the two stations, in the proper relative positions so that the radius from each of these points to the other, will pass through the same, and to proceed by intersection for all the other points; then continue gradually for all the successive horizons by reference always to the points already known. Ninth. The distances of the various points being given by their intersections, their difference in level can be determined from the reading of their zenith angles with the aid of the tables in general use. The corrections for sphericity, refraction, &c., may be also obtained from these tables.

In Fig. 5 are represented tracings obtained from two stations X and Y, the points $O'$ $O^2$ indicating the position of the instrument at the two stations. The several points sighted 1, 2, 3, &c. at the intersections of the lines of sight, are indicated on the tracings by corresponding figures.

*Second case. From a point to sight an object of known dimensions, and to obtain directly a drawing of the successive positions of this object under the form of a map or plan.*—First. Detach the pencil from R, and engage it with B. Second. Bring the slide G into suitable position. Lift the pencil. By the aid of lever 1, make the telescope follow the lateral movements of the object. At the same time, if there be occasion, work the wheel $b$, so that the telescope follows also the changing level of the object. At each station bring the telescope by means of the wheel $b$ and the rule B upright B', and slide G, by means of the wheel $b'$ into such position, that the wires of the micrometer 9 coincide with the two ends of the object, and the pencil being lowered trace on the tablet the distance between the said ends, reduced according to the selected scale.

With sufficient practice and in an open country, the operator can follow the object with a continuous movement, and the distance between the lines of the micrometer varying at the same time as the direction is azimuth, the pencil will trace a continuous line corresponding to the route of the object.

I claim as my invention or discovery:

1. An apparatus comprising in connection with a telescope mounted in alt-azimuth and a tablet-holder, the following parts, namely, a pencil or marker supported in a vertical position and connections whereby the movements of said telescope in altitude and azimuth are transmitted to said pencil or marker and may be traced upon a horizontal tablet, substantially as described.

2. In combination with a telescope and the bar the horizontal piece and the post constituting with said telescope, a jointed parallelogram, the following parts; namely the slide in said horizontal piece, a horizontal adjustable rule an upright carried by said rule and having a slot and pin connection with said slide, and a pencil or marker supported vertically by said rule substantially as described.

3. The combination with a telescope, a tablet-holder and the bar, the horizontal piece and the post, constituting with said telescope a jointed parallelogram, of the slide in said horizontal piece, an adjustable rule, an upright carried by said rule and having a slot and pin connection with said slide, and a pencil supported in a vertical position by and movable with said rule, substantially as described.

4. The combination with a telescope and the bar, the horizontal piece and the post constituting with said telescope a jointed parallelogram, of the slide in said horizontal piece, an adjustable rule, the upright on said rule and an adjustable micrometer connected with said slide, substantially as described.

5. The combination with a telescope, a tablet holder, and the bar, the horizontal piece and the post constituting with said telescope a jointed parallelogram, of the slide in said horizontal piece, an adjustable rule, the upright on said rule, an adjustable micrometer connected with said slide, and a pencil or marker movable with said rule, substantially as described.

6. The combination with a telescope provided with a tablet secured thereto in a vertical position, and the bar, the horizontal piece and the post constituting with said telescope a jointed parallelogram, of the adjustable micrometer, the slides in said horizontal piece, an adjustable rule, the upright on said rule, and the wires one in the line of vision, the other upright, substantially as described.

7. An apparatus comprising a jointed parallelogram of which the telescope is part, a pencil or marker, an adjustable micrometer, and a vertical tablet, substantially as described.

8. An autographic telescopic instrument comprising in connection with a telescope mounted in alt-azimuth and a pencil or marker, two sets of pencil operating devices as follows; namely, first the rule and connections through which the movements of the telescope in alt-azimuth may be transmitted to said pencil or marker, and second the adjustable micrometer, the bar and horizontal piece constituting with said telescope and its post, a jointed parallelogram, the adjustable rule and upright and slide in said horizontal piece connected with said micrometer and also with said upright, substantially as described.

In testimony whereof I have signed this specification in the presence of two subscribing witnesses.

JEAN FRANÇOIS DANIEL SCHRADER.

Witnesses:
ROBT. M. HOOPER,
JOSEPH COURNIER.